April 21, 1970 R. F. SANFORD 3,507,986
SYNC SLIPPER
Filed June 21, 1966
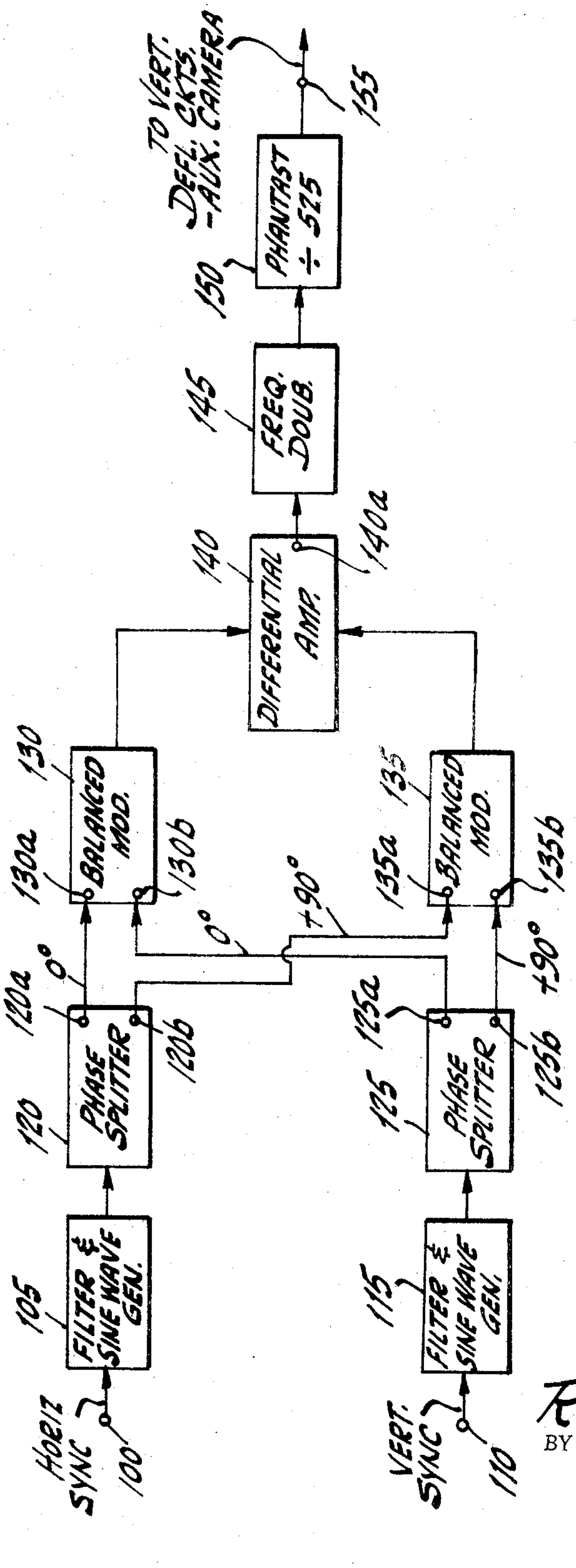
INVENTOR.
ROBERT F. SANFORD
BY
Eugene M. Whitacre
Attorney United States Patent Office 3,507,986

Patented Apr. 21, 1970

3,507,986
SYNC SLIPPER

Robert F. Sanford, Princeton Junction, N.J., assignor to RCA Corporation, a corporation of Delaware Filed June 21, 1966, Ser. No. 559,210
Int. Cl. H04n *7/16*
U.S. Cl. 178—5.8 10 Claims

ABSTRACT OF THE DISCLOSURE

For use with a system which sequentially multiplexes message representative line scan video signals developed by an auxiliary pick-up camera with primary program video signals developed by a studio pick-up camera, means are provided which develops a constant and precise slip of one horizontal line per interlaced field between the vertical deflection for the primary and auxiliary video pick-up cameras employed.

This invention relates to the transmission of special message information to the public using existing television facilities, without interfering with regular television program service.

A system which accomplishes such transmission is disclosed in pending application, Ser. No. 551,084, filed May 18, 1966, and entitled "Television Message System." One embodiment of the system therein described sequentially multiplexes message representative line scan video signals developed by an auxiliary pick-up camera with primary program video signals developed by a studio pick-up camera during predetermined portions of the vertical blanking interval thereof at a rate of one line scan signal per message per field of program information. The composite signal is then transmitted over the airways to the home receiver in the usual manner, where apparatus is additionally included to separate out the message signals at that same line per field rate. The separated message signals are then displayed, either transiently on the kinescope of the home receiver or permanently on an associated Electrofax printer, for example. Since the kinescope is cut off during this vertical blanking interval, the message video information which is included therein is not displayed at all and thus does not interfere with the regular program picture as seen by the viewer.

It will be apparent that 525 television field intervals will be required to transmit a 525 line message using the above system embodiment. It will also be apparent that a line per field rate of transmission requires that different and successive lines of the message be multiplexed with the primary program signals during the vertical blanking interval of each field in order to transmit a complete message. As pointed out in the above-identified application, such multiplexing can be effected by vertically deflecting the scanning beam of the auxiliary camera at a 60.229 or, more precisely, a 60.22857 cycle per second rate for monochrome television transmission standards when the vertical deflection rate for the scanning beam of the studio camera is 60 cycles per second. This provides a slip of exactly one horizontal line per interlaced television field between the two vertical deflections, and might be characterized as follows: in the first field interval, the electron beam in the studio camera might be scanning line 1 of its field while the electron beam in the auxiliary camera might also be scanning line 1 of its field; in the second field interval, the electron beam in the studio camera would again be scanning line 1 of its field but the electron beam in the auxiliary camera would be scanning line 2 of its field; in the third field interval, the electron beam in the studio unit would again scan line 1 of its field but the electron beam in the auxiliary unit would this time be scanning line 3 of its field, etc. The video message signals thus developed by the auxiliary camera are then sequentially inserted into predetermined portions of the vertical blanking interval of the primary program signals at the line per field rate to form the composite signals to be transmitted.

It is an object of the present invention to provide a vertical synchronizing frequency slipper for use in such a television message system and, more particularly, one which develops a constant and precise slip of one horizontal line per interlaced field between the vertical deflections for the primary and auxiliary video pick-up units employed.

As will become clear hereinafter, such a sync slipper uses techniques similar to those used in single side-band practice to form a 15,810 cycle sinusoidal signal from the standard 15,750 cycle horizontal synchronizing pulse and 60 cycle vertical synchronizing pulse signals available in the television message system. This signal is then doubled in frequency to a 31,620 cycle sinusoidal signal and divided in frequency by 525 and converted to a pulse to give a 60.22857 cycle pulse signal. As was previously mentioned, this is the vertical pulse signal that is required for a line per television field slip frequency.

For a better understanding of the present invention, together with further objects thereof, reference is had to the following description taken in connection with the accompanying drawing, and its scope will be pointed out in the appended claims.

Referring to the drawing, there is shown a block diagram of a vertical synchronizing frequency slipper embodying the present invention. Horizontal synchronizing pulses of 15,750 cycles per second repetition rate are applied via input terminal 100 to a first filter and sine wave generator unit 105, wherein they are converted to sinusoidal signals of like frequency. Vertical synchronizing pulses of 60 cycles per second repetition rate are similarly applied via input terminal 110 to a second filter and sine wave generator unit 115 wherein they are also converted to sinusoidal signals of the same frequency. These 15,750 cycle and 60 cycle pulse signals may be supplied from the same synchronizing signal generator of the television message system as supplies the horizontal and vertical drive pulses used by the video pick-up camera or associated studio equipment in generating the primary program television information, as is described in the Ser. No. 551,084 application. Alternatively, these pulse signals may be supplied from a local synchronizing signal generator which is locked to that of the television message system.

The 15,750 cycle sinusoidal signal developed by the generator unit 105 and the 60 cycle sinusoidal signal developed by the unit 115 are respectively coupled to phase splitter units 120 and 125. Each of the units 120 and 125 operates to produce a first signal which is in phase with its respective input signal and a second signal which lags it in phase by 90°, and may be of suitable construction. The "in phase" signal from unit 120 is developed at its output terminal **120*a* and is coupled to one input of a first balanced modulator 130, while the 90° phase lagging signal from unit 120 is developed at its output terminal 120*b* and is coupled to one input of a second balanced modulator 135. Similarly, the "in phase" signal from unit 125 is developed at its output terminal 125*a* and is coupled to a second input of the modulator 130, while the 90° phase lagging signal from unit 125 is developed at its output terminal 125*b* and is coupled to a second input of the modulator 135. The balanced modulators 130 and 135 may be of suitable and identical construction, to suppress the carrier waves from the phase splitter units 120 and 125** and to develop the side-band components at their output terminals in the usual fashion.

Considering, first, the operation of balanced modulator 130, the horizontal and vertical synchronizing frequency signal voltages applied to its input terminals 130*a* and 130*b* can be respectively expressed as:

$$e_h = E_1 \cos \omega_h t \quad (1)$$

and $$e_v = E_2 \cos \omega_v t \quad (2)$$

where $\omega_h$ represents $2\pi$ times the frequency of the horizontal synchronizing signal and where $\omega_v$ represents $2\pi$ times the frequency of the vertical synchronizing signal. The side-band modulation products from modulator 130 may then be expressed as $$e_{130} = \frac{E_1E_2}{2} \cos (\omega_h + \omega_v)t + \frac{E_1E_2}{2} \cos (\omega_h - \omega_v)t \quad (3)$$

Considering, next, the operation of balanced modulator 135, the horizontal and vertical synchronizing frequency signal voltages applied to its input terminals 135*a* and 135*b* can be respectively expressed as:

$$e_{h'} = E_1 \cos (\omega_h t + 90°) \quad (4)$$

and $$e_{v'} = E_2 \cos (\omega_v t + 90°) \quad (5)$$

where $\omega_h$ and $\omega_v$ are as defined above. The side-band modulation products from modulator 135 may therefore be expressed as:

$$e_{135} = \frac{E_1E_2}{2} \cos [(\omega_h + \omega_v)t + 180°] + \frac{E_1E_2}{2} \cos (\omega_h - \omega_v)t \quad (6)$$

or $$e_{135} = -\frac{E_1E_2}{2} \cos (\omega_h + \omega_v)t + \frac{E_1E_2}{2} \cos (\omega_h - \omega_v)t \quad (7)$$

These two sets of side-band components developed by the modulator units 130 and 135 are then coupled to a differential amplifier 140 of suitable construction, to subtract and cancel the lower side-bands. The signal developed at the output terminal 140*a* of amplifier 140 is then of the form:

$$e_{140} = E_1E_2 \cos (\omega_h + \omega_v)t \quad (8)$$

which represents a sinusoidal signal whose frequency is 15,750+60 or 15,810 cycles per second. This signal is then coupled to a suitable frequency doubler unit 145 wherein it is converted to a 31,620 cycle per second signal, with that signal then being coupled to a divide-by-525 type phantastron circuit 150, also of suitable construction. The output signal developed by the phantastron 150 is a pulse signal of 60.22857 cycles per second repetition rate and, when coupled via output terminal 155 to the vertical deflection circuits for the auxiliary video pick-up camera of the television message system, will provide the vertical slip required for the line per field rate of message transmission for such a system, as was previously described. If desired two or more phantastron circuits in cascade may be provided to effect the desired division. For example, a first phantastron circuit may provide a division of 21 and a second phantastron circuit in cascade with the first may provide a division of 25.

It will be noted that since the sync slipper operates from the same synchronizing signal generator as does the television studio equipment, a locked or fixed relation will be maintained between the vertical deflection for the studio and auxiliary pick-up cameras. As a result, a constant and precise line per field slip will be maintained between the vertical deflections for those cameras.

The foregoing material has described an embodiment of the invention in which the vertical deflection rate for the auxiliary camera is greater than that required for the primary or studio camera. A slip of exactly one horizontal line per interlaced field between these cameras can also be effected in an embodiment in which the vertical scan rate for the auxiliary unit is less than that for the studio unit. A line per field slip in such an embodiment might be characterized as follows: in the first field interval, the electron beam in the studio camera might be scanning the last line of its field while the electron beam in the auxiliary camera might also be scanning the last line of its field; in the second field interval, the electron beam in the studio camera would again be scanning the last line of its field but the electron beam in the auxiliary camera would be scanning the next to last line of its field; in the third field interval, the electron beam in the studio unit would again scan the last line of its field but the electron beam in the auxiliary unit would this time be scanning two lines up from the last line of its field, etc. When the video message signals thus developed by the auxiliary camera are properly multiplexed and transmitted with the primary program signals and then separated at the home receiver, a bottom-to-top record of the message information can be displayed by the Electrofax printer, as contrasted with the top-to-bottom display provided when the scan rate for the auxiliary pick-up device exceeds that of the studio unit. Where it is desired to produce this type of a display, the differential amplifier 140 of the drawing could be replaced by one which cancels, instead, the upper side-band components and adds the lower side-band components to form its output signal. The pulse signal developed by the phantastron circuit 155 would then have a repetition rate for monochrome transmission of 59.77143 cycles per second and would be the vertical pulse signal required for this type of line per television field slip frequency.

In general, therefore, it will be noted that the line per field pulse repetition rate required is essentially equal to the number of horizontal lines scanned per second plus (or minus) the number of horizontal lines to be vertically slipped per second, with the result divided by the number of horizontal lines per field of program information. For monochrome television transmission, this reduces to the expression:

$$\text{Pulse repetition rate} = \frac{2(f_h \pm f_v)}{525} \quad (9)$$

where $f_h$ and $f_v$ represent the horizontal and vertical scanning rates respectively.

It will be understood that for color television transmission the resulting output frequency will differ from that for monochrome television systems because the line scanning rate for color transmission is 15,734.264 cycles per second and the field rate is 59.94 cycles per second. To provide a slip of one line per field in a color transmission system, the same apparatus as described may be used, but the output frequency will be 60.16921 cycles per second for the embodiment of the invention in which the auxiliary camera scan rate exceeds the primary camera scan rate or 59.83079 cycles per second for the embodiment where the situation is the reverse.

What is claimed is:

1. For use in conjunction with a television message system of the type wherein message representative line scan video signals developed by an auxiliary video pick-up device are to be sequentially multiplexed with regular television program video signals developed by a primary video pick-up device during predetermined portions of the vertical blanking interval thereof at a rate of one line scan signal per message per field of program information, apparatus comprising:

means for supplying pulses at a first line scan rate and at a first field scan rate to deflect the scanning beam of said primary video pick-up device to develop said regular program signals;

and means responsive to said pulses for providing pulses at said first line scan rate and at a second field scan rate to deflect the scanning beam of said auxiliary video pick-up device to develop said message representative signals;

said second field scan rate being different from said first field scan rate by an amount corresponding to that required for said auxiliary video pick-up device to scan a different number of lines by one per field of program information than is scanned by said primary video pick-up device.

2. Apparatus as defined in claim 1 wherein said second field scan rate is greater than said first field scan rate by an amount corresponding to that required for said auxiliary video pick-up device to scan one more line per field of program information than is scanned by said primary video pick-up device.

3. Apparatus as defined in claim 1 wherein said second field scan rate is less than said first field scan rate by an amount corresponding to that required for said auxiliary video pick-up device to scan one less line per field of program information than is scanned by said primary video pick-up device.

4. Apparatus as defined in claim 1 wherein said last mentioned means includes:

first means responsive to said line scan and field scan pulses for developing a first sinusoidal signal having a frequency corresponding to one of the sum and difference of the repetition rates of said pulses;

second means responsive to said first sinusoidal signal for developing a second sinusoidal signal having a frequency equal to twice the frequency of said first sinusoidal signal;

and third means responsive to said second sinusoidal signal for converting said signal to a pulse signal having a repetition rate substantially corresponding to 1/525 times the frequency of said second sinusoidal signal.

5. Apparatus as defined in claim 4 wherein said first means includes:

first sine wave generator means for converting said line scan pulses to sinusoidal signals having a frequency corresponding to the repetition rate of said line scan pulses;

second sine wave generator means for converting said field scan pulses to sinusoidal signals having a frequency corresponding to the repetition rate of said field scan pulses;

first phase splitter means coupled to said first sine wave generator means for developing a first sinusoidal signal which i sin phase with the sinusoidal signal from said first generator means and a second sinusoidal signal which lags said signal from said generator means by 90 degrees;

second phase splitter means coupled to said second sine wave generator means for developing a third sinusoidal signal which is in phase with the sinusoidal signal from said second generator means and a fourth sinusoidal signal which lags said signal from said generator means by 90 degrees;

first and second balanced modulator means;

means for coupling the "in phase" sinusoidal signals from said first and second phase splitter means to said first balanced modulator means to produce first upper and lower sideband components of said sinusoidal signals;

means for coupling the phase lagging sinusoidal signals from said first and second phase splitter means to said second balanced modulator means to produce second upper and lower sideband components of said sinusoidal signals;

and differential amplifier means coupled to an output terminal of each of said first and second balanced modulator means for cancelling corresponding ones of the first and second upper and lower side-band components of said sinusoidal signals and for adding the corresponding other of the first and second upper and lower side-band components of said sinusoidal signals and for producing said added components at an output terminal thereof.

6. Apparatus as defined in claim 5 wherein said differential amplifier means cancels the lower side-band components of said sinusoidal signals and adds the upper side-band components of said signals.

7. Apparatus as defined in claim 5 wherein said differential amplifier means cancels the upper side-band components of said sinusoidal signals and adds the lower side-band components of said signals.

8. Apparatus as defined in claim 4 wherein said second means includes a frequency doubler circuit.

9. Apparatus as defined in claim 4 wherein said third means includes a phantastron counting circuit.

10. In a television transmission system, apparatus comprising:

means for supplying pulses at a horizontal line scanning rate;

means for supplying pulses at a vertical field scanning rate;

means responsive to said first and second scanning rate pulses for developing a sinusoidal signal having a frequency corresponding to one of the sum and difference of the scanning rates of said pulses;

and means responsive to said sinusoidal signal for converting said signal to a pulse signal having a repetition rate substantially corresponding to $k$ times the frequency of said sinusoidal signal where $k$ equals $$\frac{1}{\text{number of scanning lines per television field}}$$

References Cited

UNITED STATES PATENTS

| | | | |
|---|---|---|---|
| 2,502,213 | 3/1950 | Fredendall et al. | 178—5.6 |
| 2,874,213 | 2/1959 | Beers | 178—5.6 |
| 3,046,331 | 7/1962 | Gebel | 178—6.8 |

ROBERT L. GRIFFIN, Primary Examiner

B. L. LEIBOWITZ, Assistant Examiner

U.S. Cl. X.R.

178—69.5